R. SAITTA.
PISTON.
APPLICATION FILED JUNE 27, 1919.

1,332,760.

Patented Mar. 2, 1920.

WITNESSES
Edw. Thorpe
J.C. Ledbetter

INVENTOR
Richard Saitta
BY
ATTORNEYS

UNITED STATES PATENT OFFICE.

RICHARD SAITTA, OF HONOLULU, TERRITORY OF HAWAII.

PISTON.

1,332,760.  Specification of Letters Patent.  Patented Mar. 2, 1920.

Application filed June 27, 1919. Serial No. 307,068.

*To all whom it may concern:*

Be it known that I, RICHARD SAITTA, a citizen of the United States, and a resident of Honolulu, county of Honolulu, and Territory of Hawaii, have invented a new and Improved Piston, of which the following is a full, clear, and exact description.

This invention relates to engine pistons, and more particularly to piston construction adapted for use in internal combustion motors. The invention relates to pistons and piston rods wherein the two elements are mounted in operable relation one with the other.

An object of the invention is to provide a piston fitted with a piston rod which will dispense with the usual wrist pin bearing, and provide a more suitable and flexible type of bearing connection between the piston and connecting rod.

A feature of the invention resides in a special insert plug fitted with a retaining cap pivotally joining with a spherical head formed on a piston rod so as to make a new form of ball and socket joint adapted for internal combustion motor pistons.

With the above principal objects in view, the invention has relation to a certain form of ball and socket joint connections for pistons and connecting rods, an example of which is portrayed in the following description, shown in the presented drawings, and specifically pointed out in the appended claim.

In the drawings, Figure 1 shows a sectional view of the piston taken parallel with the axis thereof; and Fig. 2 shows a bottom view of said piston or a view taken upon the line 2—2 of Fig. 1.

Figure 1:
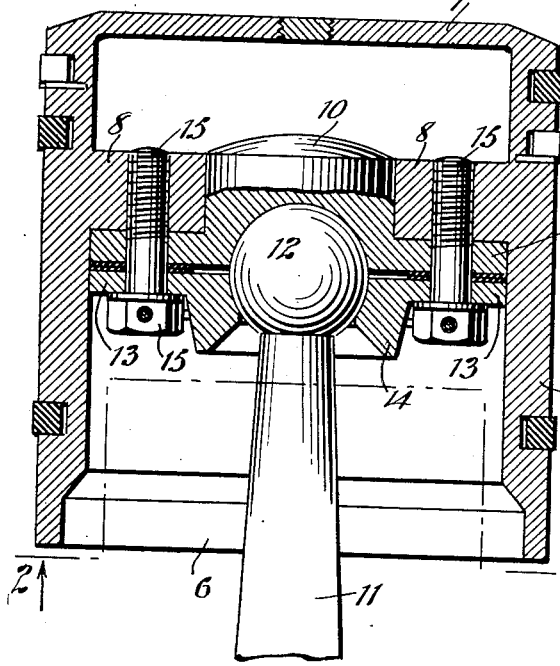
Figure 2:
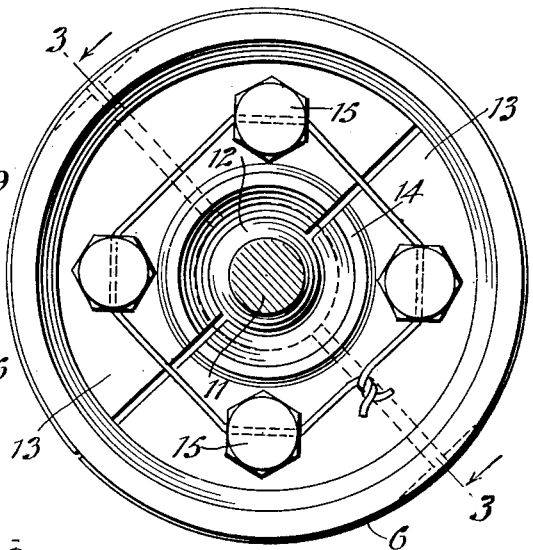
Figure 3:
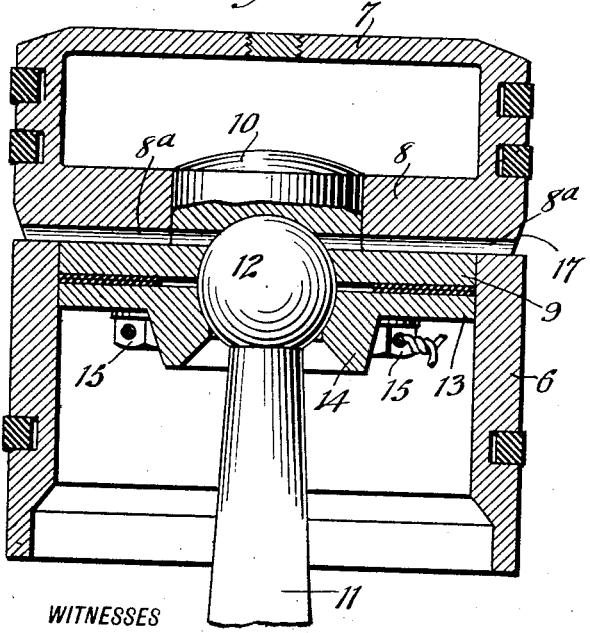
Fig. 3 shows a sectional view taken on the line 3—3 of Fig. 2, this view being a section similar to Fig. 1.
Figure 4:
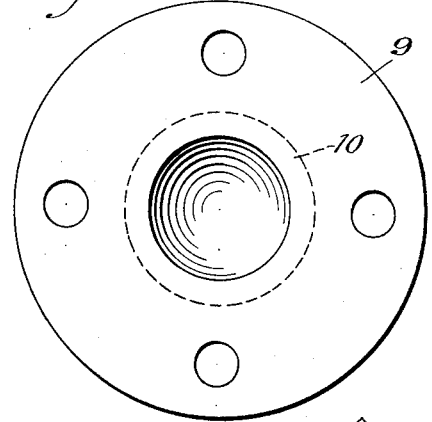
Fig. 4 shows an underneath view of an insert plug bearing forming a part of the ball and socket joint connection.

In constructing a piston and parts thereof according to the plans of this disclosure, I employ a specific form of hollow semispherical plug forming a base for the ball and socket joint. And in connection with this insert plug there is employed a ball and socket joint which firmly mounts a piston upon a connecting rod. The whole structure makes for flexibility and smoothness in mechanical operation, in that all possibility of cramping or lateral twisting of wrist pin connection and connecting rod bearings is prevented.

Referring more in particular to the drawings, the numeral 6 points out a piston of the usual type open at one end and closed at the other end thereof with a head 7. The piston is fitted with appropriate piston rings. The piston is provided with an integral web 8 formed internally within the piston at right angles with the axis thereof. This web is spaced from the head 7. This construction makes for lightness in weight, it being essential that motor reciprocating parts be comparatively light in weight to facilitate efficient mechanical operation. This web 8 is centrally bored in order to receive the socket joint insert plug as later seen.

An insert plug comprising a flange 9 integrally formed with a centering stud 10 is provided. The insert plug is formed with a hollow semi-spherical seat for a ball and socket connection. The centering stud closely fits the bore of the web, and the flange 9 closely fits the interior peripheral bore of the piston with a face of the flange laying in contiguous relation with a face of the web. An oil groove 8ª is cut in the web 8, and likewise a similar oil groove is cut through the centering stud 10 such that the two oil grooves connect with each other to form a continuous passage laterally through the piston, opening at diametrically opposite points on the interior cylindrical surface of the piston. The exterior termini of the oil grooves 8ª form an upwardly inclined surface or angular face 17. Thus oil will be collected at the termini 17 due to the reciprocating piston, and will be led through the passage 8ª to the ball and socket joint to thoroughly lubricate all parts thereof. A suitable number of tapped holes are formed in the web 8 and in the flange 9 adapted to register one with the other.

A connecting rod 11 is provided with a spherical head 12 integrally formed with said rod. The spherical head of said rod is placed in position within the hollow semispherical seat formed in the insert plug.

A retaining cap comprising a flange 13 integrally formed with a head 14 is employed to complete the ball and socket joint. The head 14 is semi-spherically bored on the same radius with the seat of the insert plug.

The outer face of the head 14 is counterbored in order that the connecting rod 11 may have universal freedom of movement within the ball and socket joint formed by placing the insert plug and retaining cap in position. The flange of the retaining cap is provided with a number of holes to register with the holes of the above described members. Cap screws 15 are employed to secure the parts together. Shims may be placed between the insert plug and retaining cap in order to form an appropriate bearing fit between the ball and the socket. The heads of the cap screws may be provided with holes formed therein, and a wire passed through the hole of each cap screw head so as to lock the cap screws in position.

Figure 5:
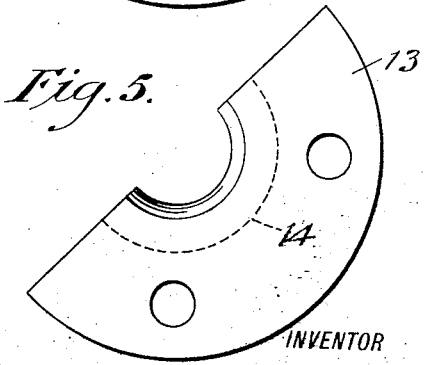
Fig. 5 shows one of the retaining caps employed to form the ball and socket joint.

The retaining cap will preferably be made in two sections. Fig. 5 illustrates one of the half sections of the retaining cap. The two half sections of the retaining cap are placed in position and secured by the cap screws. In removing the connecting rod from the ball and socket connection, it will be only necessary to remove one of the half sections from the retaining cap. This will greatly facilitate repair and adjustment of the parts.

Having thus described my invention, what I claim as new, and desire to secure by Letters Patent is:

A piston and connecting rod construction comprising in combination; a piston having a web, an insert plug consisting of a centering stud and a flange fitted into the piston, a connecting rod provided with a spherical head formed on one end thereof working within a semi-spherical bearing seat formed in the insert plug, a retaining cap comprising a head and a flange surrounding the head, cap screws passed through the two flanges and the web to secure all parts together, and an oil passage formed laterally through the web and the insert plug to transmit oil to the bearing seat.

RICHARD SAITTA.